Figure 3:
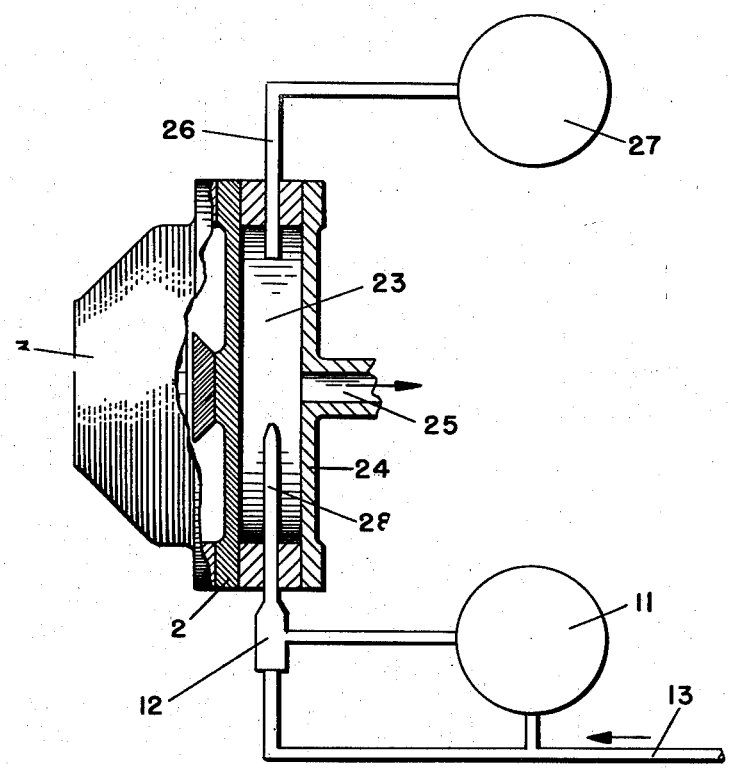

Oct. 3, 1950 — R. S. ROBINSON — 2,524,573
METHOD FOR PRODUCING DISPERSIONS
Filed Jan. 24, 1946 — 2 Sheets-Sheet 1
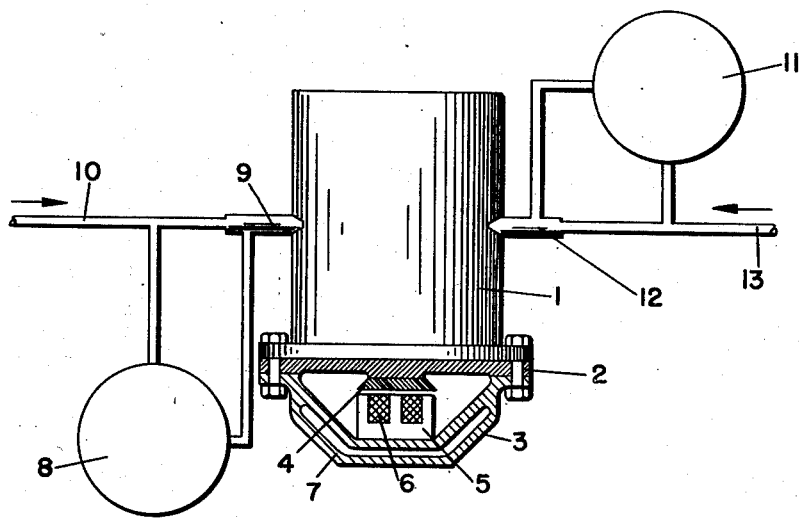
FIG. 1
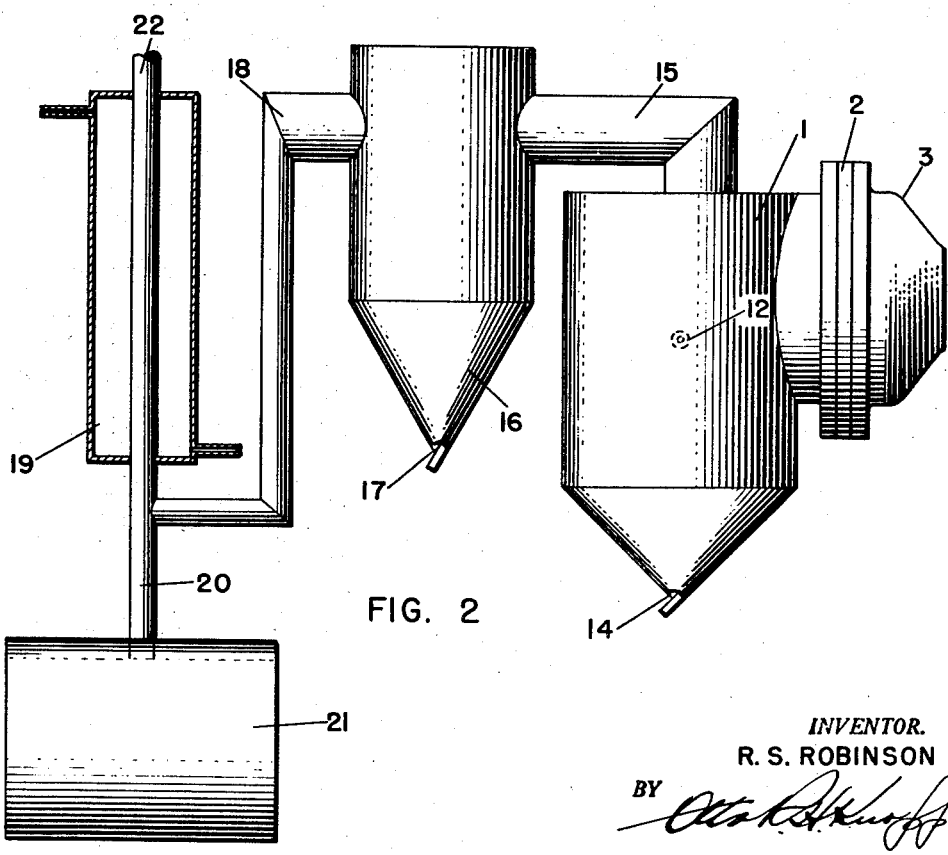
FIG. 2
INVENTOR.
R. S. ROBINSON
BY 
HIS ATTORNEY Oct. 3, 1950 R. S. ROBINSON 2,524,573
METHOD FOR PRODUCING DISPERSIONS
Filed Jan. 24, 1946 2 Sheets-Sheet 2

INVENTOR.
R. S. ROBINSON
BY
HIS ATTORNEY

UNITED STATES PATENT OFFICE 2,524,573

METHOD FOR PRODUCING DISPERSIONS

Richard S. Robinson, Gloucester, Mass., assignor, by mesne assignments, to Raytheon Manufacturing Company, a corporation of Delaware Application January 24, 1946, Serial No. 643,168

1 Claim. (Cl. 259—1)

The present invention relates to the dispersion of solids in liquids, and more particularly to the dispersion of pigments in liquid vehicles such as are used in the manufacture of paints, printing inks, and similar products.

In the manufacture of these materials the pigments are initially produced in a finely divided dry state. A satisfactory product is obtained when these pigments are completely dispersed in the fluid medium. However, when the pigments are added to the liquids by simple mixing, cohesion between the particles prevents a certain portion of them from being "wetted out." As a result, the product tends to contain a certain amount of agglomerates which, in application, resemble large particles. In order to reduce these agglomerates, it has been necessary to resort to special equipment producing high shearing forces, such as rolling mills or ball mills. The use of such equipment introduces into the manufacture an operation which is in addition to the regular pre-mixing operation and therefore represents an added cost.

According to the present invention a completely dispersed product is produced without the appearance of agglomerates so that expensive rolling or grinding equipment and its operation are made unnecessary.

According to the present invention the solids and liquids are combined while both are in a highly dispersed state. This is accomplished by introducing initially dispersed solids and initially dispersed liquids simultaneously into a high intensity compressional wave field existing preferably in a gaseous medium. Since both solid and liquid phases are very finely divided, they will tend to remain dispersed for a time. The high degree of agitation produced by the compressional waves results in such an intimacy of mixture of the solid and liquid particles that a wetting of the individual solid particles is obtained. The coalesced solid and liquid particles are then removed from the sound field in a homogeneous mass.

Any appropriate arrangements may be used to carry out the method described. As an example, the solid and liquid phases may be atomized separately and blown into a chamber subjected to intense compressional wave vibration. Care should be taken to make certain that the solid particles are dispersed to their ultimate particle size when they enter the compressional wave chamber. The product resulting from the union of the solid and liquid particles may be removed from the compressional wave chamber by various means, depending upon consistency of the product. In most cases the product may be permitted to flow by gravity into appropriate receptacles.

An example of an arrangement suitable for carrying out the invention is shown in the accompanying drawings in which Fig. 1 represents schematically a plan view of the necessary equipment; Fig. 2 shows schematically an elevation of an apparatus for removing the treated material from the compressional wave chamber; Fig. 3 shows a modification of the invention in partial horizontal section; and Fig. 4 shows an elevation, partially in section, of Fig. 3.

As shown in Fig. 1 there is provided a mixing chamber 1 in which an intense compressional wave vibrational field is set up and continuously maintained. This may be accomplished in any suitable manner, for example, by means of a vibratory diaphragm 2 formed at one end of the chamber. The diaphragm 2 may be vibrated by means known in the art, for example by the vibrator 3. The diaphragm 2, being firmly clamped at its edges, may be provided with a magnetic armature 4. Close to the armature 4, but separated from it by a suitable air gap, there may be arranged an electromagnet 5 having an operating coil 6. The magnet 5 may be fixed to a stationary back member 7 which may form part of a casing enclosing the electromagnet structure. If the magnet coils 6 be energized with alternating current of a suitable frequency, the diaphragm 2 will be set into vibration, thereby producing an intense sound field within the chamber 1. Solid particles in a finely divided dry state, contained in a storage chamber 8, may be blown into the chamber 1 through an atomizer 9 by means of compressed air entering the pipe 10. Similarly, at the opposite side of the chamber 1, liquid contained in storage tank 11 may be blown into the chamber in a highly dispersed state through an atomizer 12 supplied with compressed air through the pipe 13.

The vibration chamber 1 is shown in elevation in Fig. 2 with the vibrator 3 at its side. The solid and liquid storage tanks and atomizers are omitted in this view. The chamber 1 may be made V-shaped in the bottom with an opening at 14 through which the coagulum of mixed solid and liquid particles may flow, after dropping through the chamber, by gravity. The excess air in the chamber, together with some suspended matter, may pass out through a pipe 15, in the upper part of the chamber 1, into a collecting chamber 16, also V-shaped at the bottom, and provided with an aperture 17 through which the particles which settle out by gravity may be removed. Air, carrying mainly some liquid in the vapor phase, is then passed into another pipe 18 which leads through a condenser 19 producing a final condensation of the liquid vapor which is drained through pipe 20 into a collecting chamber 21. Any remaining air escapes through the upper portion 22 of the pipe 20.

Figure 4:
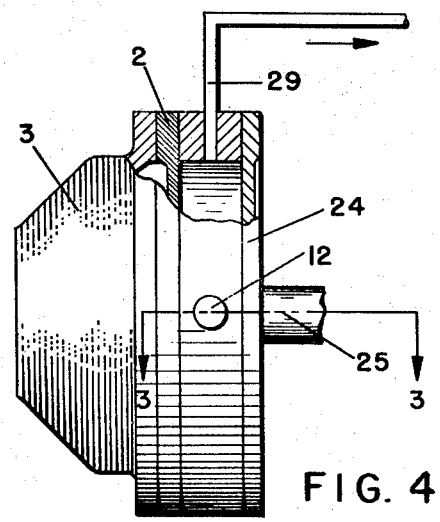

A modification of my invention is illustrated in Figs. 3 and 4. In some cases it will be found preferable not to disperse the liquid particles but rather to maintain the liquid in its fluid state and to blow the solid particles which are to be mixed with the liquid into the liquid while the liquid is in a state of intense compressional wave vibration. Care must be taken to insure that the solid particles, when they first come in contact with the liquid, are separated from each other to their ultimate particle size.

The apparatus for accomplishing this as shown in Fig. 3 comprises a compressional wave vibration device 3 having a vibrating diaphragm 2 substantially as shown in the other figures. However, in front of the diaphragm 2 there is formed a more or less flat cylindrical chamber 23 closed by a cover plate 24 having an outlet 25 for the egress of the mixed material. Chamber 23 is at all times maintained full of liquid through the pipe 26 which may be supplied from the bulk liquid storage tank 27. The solid particles are introduced into the chamber 23 by an arrangement which may be similar to that of Fig. 1 and include atomizer 12 supplied with air through pipe 13. The pigment or other finely divided solid material is contained in the storage chamber 11 from which it is fed to the atomizer 12. The atomizer 12 is provided with an extended nozzle 28 which passes through the side wall of the chamber 23 into the chamber to a region near the center of the diaphragm 2 where the maximum intensity of compressional wave vibration exists. While in the drawing the liquid has been shown entering vibration chamber 23 from the top and the solid from the bottom, it will be understood that it may be preferable to have these elements in the horizontal plane, or the whole unit may be turned in other directions depending upon whether it may be desirable to take advantage of gravity in assisting the flow of the materials.

In the operation of this arrangement it will be evident that the dispersed solid will enter the liquid in the vibration chamber 23 within globules of air. Such air will collect and be driven out of the liquid by the vibration and may be removed through the opening 25 along with the coagulum or, if desired, the air may be drawn off the top of the vibrating chamber by a negative pressure through the pipe 29 as illustrated in Fig. 4.

Having now described my invention, what I claim is:

Method of producing dispersion of solids and liquids which comprises finely dividing and dispersing the solid and the liquid to be treated into separate dispersions and bringing together the dispersed solid and liquid particles while subjecting the same to the influence of intense compressional wave vibrations.

RICHARD S. ROBINSON.

REFERENCES CITED

The following references are of record in the file of this patent:

UNITED STATES PATENTS

| Number | Name | Date |
|---|---|---|
| 862,856 | Tygard | Aug. 6, 1907 |
| 1,980,171 | Amy | Nov. 13, 1934 |
| 2,163,649 | Weaver | June 27, 1939 |
| 2,363,937 | Brandt | Nov. 28, 1944 |

FOREIGN PATENTS

| Number | Country | Date |
|---|---|---|
| 57,144 | Denmark | Jan. 15, 1940 |
| 433,583 | Great Britain | Oct. 2, 1934 |